UNITED STATES PATENT OFFICE.

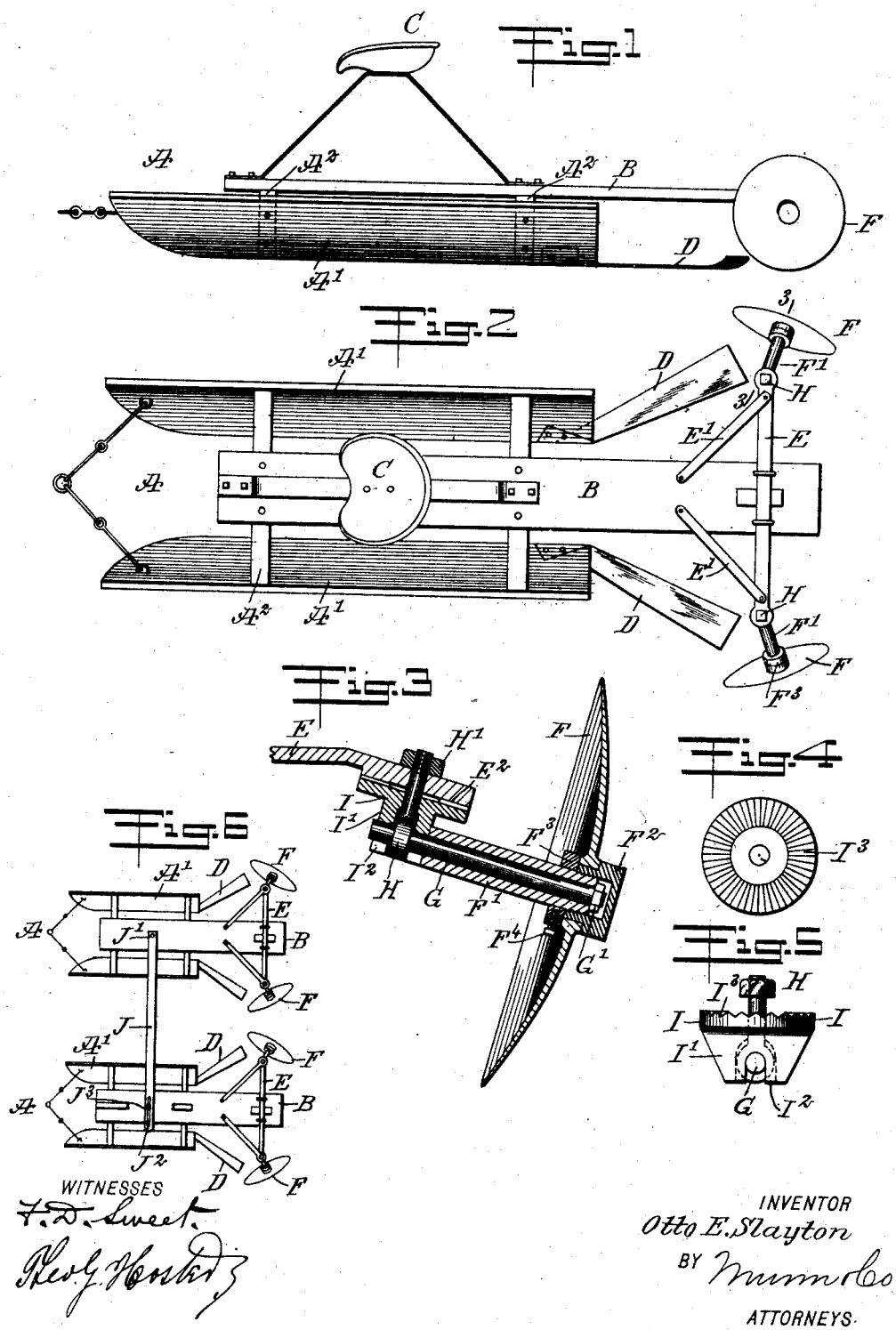

OTTO EARL SLAYTON, OF DILLON, OKLAHOMA.

WEED-CUTTER AND CULTIVATOR.

No. 882,973.  Specification of Letters Patent.  Patented March 24, 1908.

Application filed June 19, 1907. Serial No. 379,734.

*To all whom it may concern:*

Be it known that I, OTTO EARL SLAYTON, a citizen of the United States, and a resident of Dillon, in the county of Blaine, Oklahoma, have invented a new and Improved Weed-Cutter and Cultivator, of which the following is a full, clear, and exact description.

The invention relates to agricultural implements, and its object is to provide a new and improved weed cutter and cultivator, more especially designed for cutting weeds and cultivating corn and cotton in listed rows, in a very effective manner.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a side elevation of the improvement; Fig. 2 is a plan view of the same; Fig. 3 is an enlarged cross section of one of the disk wheels, the section being on the line 3—3 of Fig. 2; Fig. 4 is a plan view of the adjusting member for a disk wheel; Fig. 5 is a side elevation of the same, and Fig. 6 is a plan view of the improvement arranged as a double-row machine.

A sled A, is provided with runners A', inclined toward each other and rigidly connected with each other by cross bars A², supporting a runner board B, carrying a seat C for the operator. On the rear end of the runners A' are secured outwardly and rearwardly extending flat knives D, for cutting the weeds as the sled A is drawn along.

On the rear end of the board B is secured a transversely extending bar E, connected by braces E' with the runner board B, and the said bar E supports disks F, arranged obliquely to the line of movement of the sled A and located in the rear and somewhat outside of the rear ends of the knives D, as plainly indicated in the drawings. Each of the disks F has a hub F', screwing in a nut F² centrally engaging disks F (see Fig. 3) secured in place on the nut F² by a collar F³, fastened by a set screw F⁴ to the hub F'. By the arrangement described the parts of the disks F can be filled with oil or other lubricant, to lubricate the axle G, extending through the hub F' and carrying at its outer end a nut G', extending into the nut F² to hold the hub F' against outward movement on the axle G. The forward end of the axle G is engaged by the eye of an eye-bolt H, extending through an adjusting member I, and engaging the corresponding outer end of the bar E, as plainly shown in the drawings. The forward end of the hub F' abuts against the fork I' of a member I, the fork having recesses I², for the reception of the axle G, so that when the nut H' of the bolt H is screwed up against the top of the bar E then the axle G is firmly clamped in position in the fork I' of the adjusting member I. The top surface I³ of the adjusting member I, is serrated to engage corresponding serrations E², formed on the under side of the terminal of the cross bar E, so as to securely hold the adjusting member I in position, to give the desired inclination to the axle G and consequently to the disks F.

The operation is as follows: When the sled A is drawn forward, the runners A' are astride of the growing crop in the listed furrows, so that the knives D and the disk wheels F extend on each side of a row of plants, such as corn or cotton, and the knives in moving forward with the sled cut the weeds and stir the soil. The disks F run on top of the ridges on either side for the purpose of stirring the soil, cutting the weeds and throwing soil onto and around the roots of the growing plants. It is understood that by seating the disks F in an oblique position, they readily rotate when the sled is drawn forward, and in doing so throw the soil readily up against the growing crop.

Two machines like the one described may be used at same time for cultivating two rows at once, and in this case the two machines are connected with each other by a cross bar J (see Fig. 6) pivotally connected at J' to the runner board B of one machine and having a transverse sliding connection with the runner board B of the other machine, the bar being for this purpose provided with an elongated slot J² engaging a pin J³ on the runner board B of the second machine. Thus when the sleds are drawn forward, they can readily move nearer to or farther from each other according to the irregularities in the two rows in which the machines are traveling at a time, so that the two machines readily adjust themselves to the irregularities in the rows. Each machine works in the same manner as above described relative to Figs. 1 and 2.

The machine shown and described is very simple and durable in construction, is composed of comparatively few parts and not liable easily to get out of order.

Having thus described my invention, I claim as new and desire to secure by Letters Patent:

1. In a weed cutter and cultivator, a plurality of shafts, a disk for each shaft, a hub portion journaled on the shaft, a collar adjustably connected with the hub portion, a nut threaded onto the end of the hub portion and provided with a reduced portion upon which the disk is seated, said collar engaging the inner face of the disk.

2. In a weed cutter and cultivator, a shaft, and a disk, a hub portion through which the shaft passes, a nut on the end of the shaft for securing the hub portion in position, a collar adjustably connected with the hub portion, a nut threaded onto the end of the hub portion and provided with a reduced portion upon which the disk is seated, the collar engaging the inner face of the disk, and the nut inclosing the nut on the shaft.

In testimony whereof I have signed my name to this specification in the presence of two subscribing witnesses.

OTTO EARL SLAYTON.

Witnesses:
   JOHN W. CORNELL,
   ROSCOE E. CORNELL.